United States Patent
Munenaga et al.

(10) Patent No.: US 9,698,404 B2
(45) Date of Patent: Jul. 4, 2017

(54) CONNECTING BODY, MANUFACTURING METHOD OF CONNECTING BODY, ELECTRIC STORAGE DEVICE, AND MANUFACTURING METHOD OF ELECTRIC STORAGE DEVICE

(75) Inventors: Noriyoshi Munenaga, Ritto (JP); Taku Nakamura, Ritto (JP); Wataru Mashiko, Ritto (JP); Hiroshi Tasai, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 366 days.

(21) Appl. No.: 14/241,783

(22) PCT Filed: Aug. 28, 2012

(86) PCT No.: PCT/JP2012/071676
§ 371 (c)(1),
(2), (4) Date: Feb. 27, 2014

(87) PCT Pub. No.: WO2013/031761
PCT Pub. Date: Mar. 7, 2013

(65) Prior Publication Data
US 2014/0212740 A1 Jul. 31, 2014

(30) Foreign Application Priority Data
Aug. 29, 2011 (JP) .................... 2011-185878

(51) Int. Cl.
*H01M 4/02* (2006.01)
*H01M 2/26* (2006.01)
(Continued)

(52) U.S. Cl.
CPC .......... *H01M 2/263* (2013.01); *H01M 2/06* (2013.01); *H01M 2/22* (2013.01); *H01M 2/305* (2013.01);
(Continued)

(58) Field of Classification Search
CPC ....................................... H01M 4/02
See application file for complete search history.

(56) References Cited

U.S. PATENT DOCUMENTS

| 8,623,545 B2 | 1/2014 | Kim et al. |
| 2010/0233528 A1 | 9/2010 | Kim et al. |

(Continued)

FOREIGN PATENT DOCUMENTS

| JP | U 4-74854 | 6/1992 |
| JP | 2002-324541 A | 11/2002 |

(Continued)

OTHER PUBLICATIONS

International Search Report (ISR) (PCT Form PCT/ISA/210), in PCT/JP2012/071676, dated Oct. 9, 2012.

*Primary Examiner* — Jacob Marks
(74) *Attorney, Agent, or Firm* — McGinn IP Law Group, PLLC

(57) ABSTRACT

A connecting body for electrically connecting a power generating element and an electrode terminal positioned on a surface of a device container for housing the power generating element, the connecting body including: a plate portion positioned on the surface of the device container; and a protruding portion being in a position on a surface of the plate portion and displaced from a position of the electrode terminal, and having a tip end protruding to face the power generating element and a base with a peripheral edge surrounded with a principal face of the plate portion.

9 Claims, 14 Drawing Sheets

(51) Int. Cl.
*H01M 2/22* (2006.01)
*H01R 4/06* (2006.01)
*H01R 43/16* (2006.01)
*H01M 2/06* (2006.01)
*H01M 2/30* (2006.01)
*H01R 4/26* (2006.01)
*H01R 13/52* (2006.01)
*H01M 10/04* (2006.01)

(52) U.S. Cl.
CPC ............... *H01R 4/06* (2013.01); *H01R 4/26* (2013.01); *H01R 13/5219* (2013.01); *H01R 43/16* (2013.01); *H01M 10/04* (2013.01); *Y02P 70/54* (2015.11); *Y10T 29/49108* (2015.01); *Y10T 29/49208* (2015.01)

(56) References Cited

U.S. PATENT DOCUMENTS

| | | | |
|---|---|---|---|
| 2010/0266894 A1* | 10/2010 | Byun | H01M 2/263 429/178 |
| 2011/0076553 A1* | 3/2011 | Kameda | H01M 2/043 429/181 |

FOREIGN PATENT DOCUMENTS

| | | |
|---|---|---|
| JP | 2003-92103 A | 3/2003 |
| JP | 2009-76394 A | 4/2009 |
| JP | 2010-33766 A | 2/2010 |
| JP | 2010-73336 A | 4/2010 |
| JP | 2010-212240 A | 9/2010 |
| JP | 2011-76731 A | 4/2011 |
| JP | 2011-76885 A | 4/2011 |

* cited by examiner

CONNECTING BODY, MANUFACTURING METHOD OF CONNECTING BODY, ELECTRIC STORAGE DEVICE, AND MANUFACTURING METHOD OF ELECTRIC STORAGE DEVICE

TECHNICAL FIELD

The present invention relates to a connecting body in an electrode of an electric storage device, e.g., a secondary battery such as a lithium ion battery and other batteries, a manufacturing method of the connecting body, an electric storage device using the connecting body, and a manufacturing method of the electric storage device.

BACKGROUND ART

Secondary batteries are in widespread use for powering electronic devices such as cell-phones and IT devices, not to mention replacing primary batteries. Especially, because nonaqueous electrolyte secondary batteries represented by lithium ion batteries have high energy density, application of them to industrial large electric devices such as electric cars is facilitated.

FIG. 13 is an exploded perspective view of a prior-art nonaqueous electrolyte secondary battery (see Patent Document 1, for example).

As shown in FIG. 13, the nonaqueous electrolyte secondary battery 100 has a structure in which a power generating element 11 is housed in a metallic container main body 10 having an opening 10x and the opening 10x is closed with a lid portion 20 and sealed by laser welding or the like.

The power generating element 11 has a structure in which a positive electrode and a negative electrode which are band-shaped electrodes are wound into an elongated circular cylindrical shape with separators interposed therebetween. In a wound state, the positive electrode and the negative electrode are displaced from each other in different directions of opposite ends of a winding axis and their end portions are respectively positioned at opposite ends of the power generating element 11. Furthermore, the end portions of the respective electrodes do not support active material and pieces of metal foil which are substrates are exposed at the end portions. To the pieces of metal foil 11a, 11a' protruding from the opposite end portions of the power generating element 11, a current collection connecting body 12 on a positive electrode side and a current collection connecting body 12' on a negative electrode side which are conductive metal plates are respectively connected.

One end of the current collection connecting body 12 extends parallel to a surface of the power generating element 11 and a through hole 12a is formed in a surface of the one end. The other end is bent toward a side face of the power generating element 11 and pinched by a pinching plate 14 together with the wound piece of metal foil 11a, which is exposed on the side face of the power generating element 11, and connected and fixed by ultrasonic welding or the like. The current collection connecting body 12' on the negative electrode side has a similar structure.

At opposite ends of the lid portion 20, through holes for pulling out terminals are formed. In FIG. 13, only the through hole 20a on the positive electrode side is shown and a through hole on the negative electrode side is hidden under a part described later and is not shown. An insulating sealing member 13 is positioned between the lid portion 20 and the current collection connecting body 12 of the power generating element 11. The insulating sealing member 13 is a member made of synthetic resin and having an insulation property and certain elasticity and a through hole 13a concentric with the through hole 20a of the lid portion 20 and the through hole 12a of the current collection connecting body 12 is formed in a surface of the insulating sealing member 13.

Furthermore, an insulating sealing member 21 is positioned to be superimposed on a portion of the lid portion 20 near a short-side end portion thereof. The insulating sealing member 21 is a member made of synthetic resin similar to the insulating sealing member 13. A through hole 21b concentric with the through hole 20a of the lid portion 20 is formed in a surface of the insulating sealing member 21. A cylindrical portion 21c is formed on a side of the insulating sealing member 21 facing the lid portion 20 and the through hole 21b extends through the cylindrical portion 21c. The cylindrical portion 21c has an outer shape conforming to the through holes 20a and 13a and is fitted into the respective through holes.

Moreover, a recessed portion 21a is formed on a principal face of the insulating sealing member 21. A connecting member 32 is disposed to be fitted into the recessed portion 21a and a fixing member 31 is disposed to pass through the through hole 21b. A terminal member 30 is disposed to cover these respective members. The terminal member 30 is a plate-shaped member made of conductive metal such as aluminum, an aluminum alloy, and the like and provided with a through hole 30b concentric with the through hole 21b of the terminal member 30 and a through hole 30a through which the connecting member 32 passes.

The fixing member 31 is a member made of conductive metal such as aluminum, copper, and an alloy of them and for electrically connecting the terminal member 30 and the current collection connecting body 12 of the power generating element 11 and mechanically coupling the lid portion 20 and the power generating element 11.

The connecting member 32 is a member made of highly conductive metal such as iron and steel such as stainless steel and chromium molybdenum steel with high strength and for electrically connecting the nonaqueous electrolyte secondary battery 100 to an external load. The connecting member 32 is formed by a bolt portion 32a having a threaded surface and an anti-rotation portion 32b provided at one end of the bolt portion 32a. The anti-rotation portion 32b is in a shape conforming to the recessed portion 21a of the insulating sealing member 21 and is fitted into the recessed portion 21a to thereby restrict rotation of the bolt portion 32a about a rotation axis and prevent the connecting member 32 from running around.

Next, with reference to FIGS. 14(a) and 14(b), a structure of the prior-art nonaqueous electrolyte secondary battery 100 around an electrode portion 23 will be described. Here, the electrode portion 23 refers to an element formed by the terminal member 30, the fixing member 31, and the connecting member 32. FIG. 14(a) is a plan view of a portion of the nonaqueous electrolyte secondary battery 100 and FIG. 14(b) is a sectional view of a portion taken along straight line A-A in FIG. 14(a).

As shown in FIG. 14(a), the fixing member 31 and the bolt portion 32a of the connecting member 32 of the electrode portion 23 are disposed on a straight line parallel to long sides of the lid portion 20.

As shown in FIG. 14(b), the cylindrical portion 21c of the insulating sealing member 21 passes through the through hole 20a of the lid portion 20 and the through hole 13a of the insulating sealing member 13 and an end face of the cylindrical portion 21c is in contact with a principal face of the current collection connecting body 12, with which a principal face of the insulating sealing member 13 is also in contact. The fixing member 31 passes through the through hole 30b of the terminal member 30, the through hole 21b of the insulating sealing member 21, and the through hole 12a of the current collection connecting body 12. One end exposed on the lid portion 20 and the other end exposed on a side of the current collection connecting body 12 of the fixing member are riveted and shaped into rivet ends 31a and 31b.

Because the respective rivet ends 31a and 31b have larger outer diameters than the respective through holes, the terminal member 30, the insulating sealing member 21, the lid portion 20, the insulating sealing member 13, and the current collection connecting body 12 are pressure-bonded to each other and fixed integrally by being pinched between the rivet ends 31a and 31b. The current collection connecting body 12 and the terminal member 30 are electrically connected to each other by being connected by the fixing member 31. Because a side face of the fixing member 31 is covered with the cylindrical portion 21c of the insulating sealing member 21, the lid portion 20 and the fixing member 31 are insulated from each other.

In this way, electric power generated in the power generating element 11 is taken out of the container main body 10 through the electrode portion 23. Specifically, a solderless terminal of a wire of an external load (not shown) is attached to the bolt portion 32a and a nut conforming to a thread on the bolt portion 32a is fastened to fix the solderless terminal to the terminal member 30 to thereby complete electric connection between the nonaqueous electrolyte secondary battery 100 and the external load.

PRIOR ART DOCUMENT

Patent Document

Patent Document 1: JP-A-2003-92103

SUMMARY OF THE INVENTION

Problem to be Solved by the Invention

The prior-art nonaqueous electrolyte secondary battery has the above-described structure and the prior art has the following problem.

As shown in FIG. 14(a), the nonaqueous electrolyte secondary battery 100 and the external load are connected to and separated from each other by attaching and detaching the nut to and from the bolt portion 32a of the connecting member 32 exposed from the through hole 30a. At this time, due to torque applied about the bolt portion 32a shown with an arrow in the drawing, stress about the bolt portion 32a as a center of turning is applied to the plate-shaped terminal member 30.

This stress is also applied to a connected portion c of the fixing member 31 and the terminal member 30 pressure-bonded to each other through the through hole 30b shown in FIG. 14(b) and loosens connection between the fixing member 31 and the terminal member 30. This looseness increases electric resistance of the electrode portion 23 and hinders stable operation. Moreover, a degree of looseness increases due to use over time and may reduce sealing performance of the entire battery container including the lid portion 20.

In this manner, the prior-art nonaqueous electrolyte secondary battery has a problem of low durability from viewpoints of operation and the structure of the battery.

The present invention has been made with the above problem in view and its object is to provide a connecting body for increasing durability of an electric storage device such as a battery, a manufacturing method of the connecting body, an electric storage device using them, and a manufacturing method of the electric storage device.

Means for Solving the Problem

To achieve the above object, in accordance with a first aspect of the present invention, there is provided a connecting body for electrically connecting a power generating element and an electrode terminal positioned on a surface of a device container for housing the power generating element, the connecting body including:

a plate portion positioned on the surface of the device container; and a protruding portion being in a position on a surface of the plate portion and displaced from a position of the electrode terminal, and having a tip end protruding to face the power generating element and a base with a peripheral edge surrounded with a principal face of the plate portion.

In accordance with a second aspect of the invention, in addition to the structure of the connecting body according to the above-described first aspect, the plate portion and the protruding portion are formed as different portions of a single metallic material base.

In accordance with a third aspect of the invention, in addition to the structure of the connecting body according to the above-described first or second aspect, a principal face of the plate portion on an exposed side on the surface of the device container is flat.

In accordance with a fourth aspect of the invention, in addition to the structure of the connecting body according to any one of the above-described first to third aspects, the principal face of the plate portion from which the protruding portion protrudes is uniformly flat from the entire peripheral edge of the base of the protruding portion to an outer edge of the plate portion.

In accordance with a fifth aspect of the invention, in addition to the structure of the connecting body according to any one of the above-described first to fourth aspects, a gravity center of the plate portion is positioned between a position from which the protruding portion protrudes and the position of the electrode terminal on the plate portion.

In accordance with a sixth aspect of the invention, in addition to the structure of the connecting body according to any one of the above-described first to fifth aspects, the protruding portion has a uniform sectional shape from the tip end to the base in a protruding direction.

In accordance with a seventh aspect of the invention, in addition to the structure of the connecting body according to any one of the above-described first to fifth aspects, a length of an outer periphery of the tip end of the protruding portion continuously or discontinuously reduces.

In accordance with an eighth aspect of the invention, in addition to the structure of the connecting body according to any one of the above-described first to seventh aspects, a length of an outer periphery of the protruding portion continuously or discontinuously reduces from the surface of the plate portion toward the tip end.

In accordance with a ninth aspect of the present invention, there is provided an electric storage device including:

a power generating element;

a device container for housing the power generating element;

current collection connecting bodies respectively connected to a positive electrode and a negative electrode of the power generating element; and connecting bodies for electrically connecting electrode terminals and the current collection connecting bodies, wherein the connecting bodies according to any one of the above-described first to eighth aspects are provided as the connecting bodies, the protruding portions are connected to the current collection connecting bodies, and the plate portions are exposed on a surface of the device container.

In accordance with a tenth aspect of the invention, in addition to the structure of the electric storage device according to the above-described ninth aspect, each of the protruding portions passes through a through hole of each of the current collection connecting bodies and a tip end of the protruding portion is riveted, and the riveted tip end of the protruding portion and the plate portion sandwich at least a wall body of the device container.

In accordance with an eleventh aspect of the invention, in addition to the structure of the electric storage device according to the above-described tenth aspect, the electric storage device further includes insulating sealing members, each including a main body portion having a placement face in a shape conforming to the plate portion of the connecting body and a through hole open in the placement face and in a shape conforming to the protruding portion of the connecting body, and a cylindrical portion communicating with the through hole of the main body portion, wherein the main body portion is sandwiched between the riveted tip end of the protruding portion and the plate portion together with the wall body of the device container with the plate portion of the connecting body placed on the placement face, and the protruding portion of the connecting body is positioned in the cylindrical portion.

In accordance with a twelfth aspect of the invention, in addition to the structure of the electric storage device according to the above-described eleventh aspect, the placement face of the main body portion of each of the sealing members and the principal face of the plate portion of each of the connecting bodies are in surface contact with each other.

In accordance with a thirteenth aspect of the invention, in addition to the structure of the electric storage device according to the above-described eleventh or twelfth aspect, the main body portion of each of the insulating sealing members has a frame body formed at a periphery of the placement face and taller than the placement face and the plate portion of each of the connecting bodies is surrounded with the frame body.

In accordance with a fourteenth aspect of the invention, in addition to the structure of the electric storage device according to any one of the above-described ninth to thirteenth aspect, a position of the protruding portion on a surface of each of the plate portions is closer to a gravity center of the device container than a position of each of the electrode terminals.

In accordance with a fifteenth aspect of the invention, there is provided a manufacturing method of an electric storage device including a power generating element, a device container for housing the power generating element and having a lid portion and a container main body, current collection connecting bodies respectively connected to a positive electrode and a negative electrode of the power generating element, and connecting bodies for electrically connecting electrode terminals and the current collection connecting bodies, wherein the connecting bodies according to any one of the above-described first to eighth aspects are provided as the connecting bodies and the method includes:

a first step of passing the protruding portions of the connecting bodies through at least through holes of the current collectors connected to the positive electrode and the negative electrode of the power generating element and through holes of the lid portion; and a second step of riveting tip ends of the protruding portions to thereby sandwich the current collectors and a wall body of the device container between the plate portions and the tip ends of the protruding portions and integrally fix the connecting bodies, the current collectors, and the lid portion.

In accordance with a sixteenth aspect of the invention, there is provided a manufacturing method of a connecting body which electrically connects a power generating element and an electrode terminal positioned on a surface of a device container for housing the power generating element and which includes a plate portion positioned on the surface of the device container and a protruding portion protruding from a position on a surface of the plate portion and displaced from a position of the electrode terminal toward the power generating element, the method including:

a drawing step of drawing a portion of a plate-shaped metal member to thereby form the protruding portion; and a forging step which is carried out simultaneously with or before, or after the extruding step and which is a step of forging the other portion of the metal member having the plate shape into a predetermined shape to thereby form the plate portion.

In accordance with other aspects of the invention, the connecting body may have a through hole formed in the position of the plate portion corresponding to the electrode terminal.

In addition to the structure of the connecting body according to the above-described aspect of the invention, a recessed portion may be formed at the tip end of the protruding portion.

In addition to the structure of the connecting body according to the above-described aspect of the invention, a cavity may be formed in the protruding portion.

In addition to the structure of the electric storage device according to the above-described aspect of the invention, each of the connecting bodies may be the connecting body according to the other aspect of the invention in which the through hole is formed in the position of the plate portion corresponding to the electrode terminal and each of the electrode terminals may be a rod-shaped member having one end protruding from the surface of the device container through the through hole and the other end fixed between the wall body of the device container and the plate portion.

In addition to the structure of the electric storage device according to the above-described aspect of the invention, each of the connecting bodies may be the connecting body according to the above-described aspect of the invention in which the principal face of the plate portion on an exposed side to the surface of the device container is flat and each of the electrode terminals may be fixed to the surface of the plate portion.

In addition to the structure of the electric storage device according to the above-described aspect of the invention, each of the connecting bodies may be the connecting body according to the other aspect of the invention in which the through hole is formed in the position of the plate portion corresponding to the electrode terminal and each of the electrode terminals may be a rod-shaped member having one end protruding from the surface of the device container through the through hole and the other end fixed between the wall body of the device container and the plate portion.

In addition to the structure of the electric storage device according to the above-described aspect of the invention, each of the connecting bodies may be the connecting body according to the above-described aspect of the invention in which the principal face of the plate portion on the exposed side to the surface of the device container is flat and each of the electrode terminals may be fixed to the surface of the plate portion.

In addition to the feature of the manufacturing method of the electric storage device according to the above-described aspect of the invention, the connecting body according to the above-described aspect of the invention in which the principal face of the plate portion on the exposed side to the surface of the device container is flat may be used as each of the connecting bodies, the electrode terminals each of which is a rod-shaped member having one end protruding from the surface of the device container through the through hole and the other end having a larger outer shape than the one end may be used, and the first step may be carried out with the one end of each of the electrode terminals inserted into the through hole of the plate portion of each of the connecting bodies and the other end disposed between the lid portion and the plate portion.

Advantages of the Invention

With the above-described aspects of the invention, it is possible to improve durability of the electric storage device such as batteries.

MODES FOR CARRYING OUT THE INVENTION

Embodiments of the present invention will be described below with reference to the drawings.

(Embodiment 1)

Figure 1:
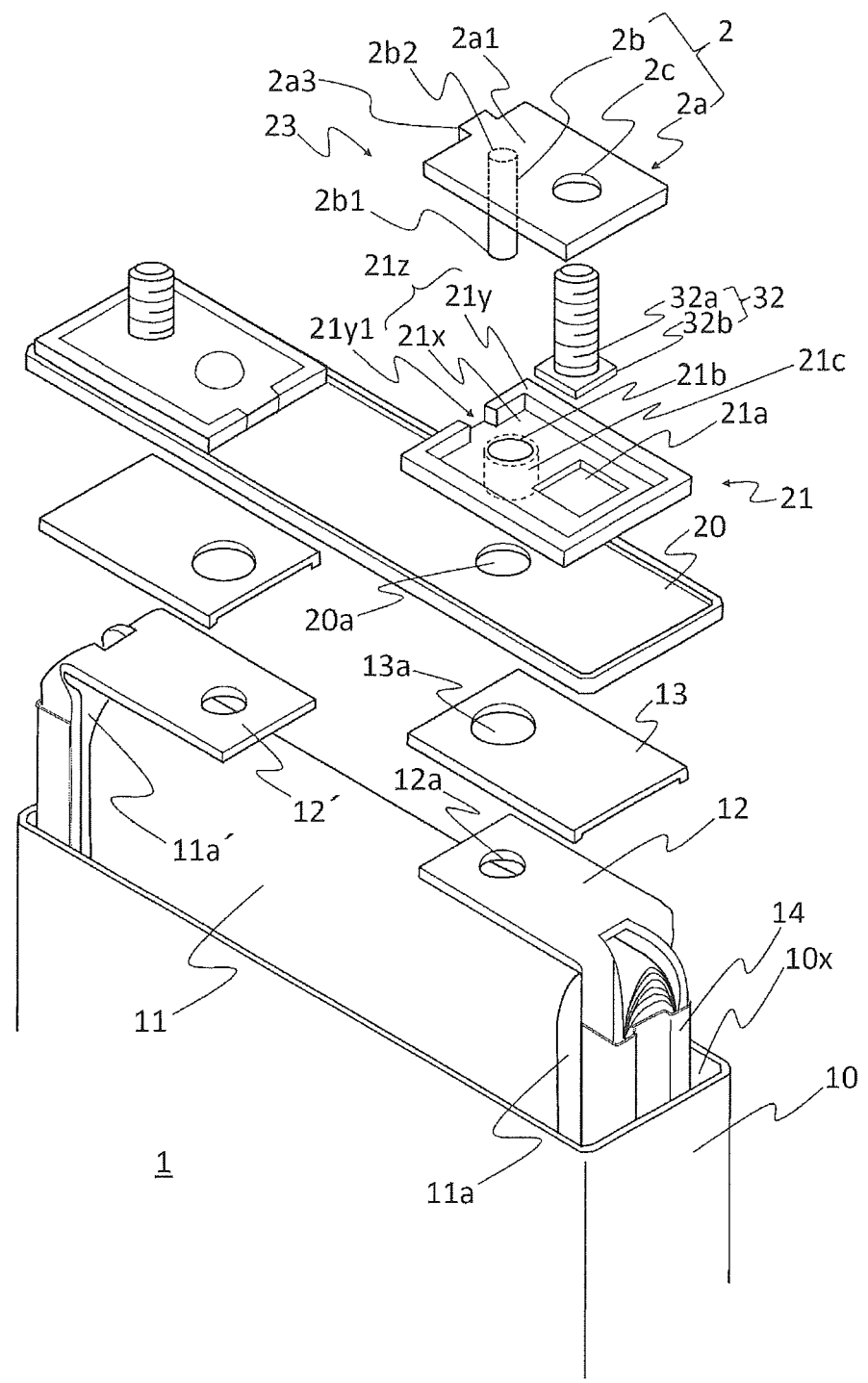
FIG. 1 is an exploded perspective view showing a structure of a nonaqueous electrolyte secondary battery according to Embodiment 1 of the present invention.

FIG. 1 is an exploded perspective view showing a structure of a nonaqueous electrolyte secondary battery 1 according to Embodiment 1 of the invention. Portions similar or corresponding to those in the prior art shown in FIG. 13 are provided with the same reference numerals and detailed description of them is omitted.

Figure 13:
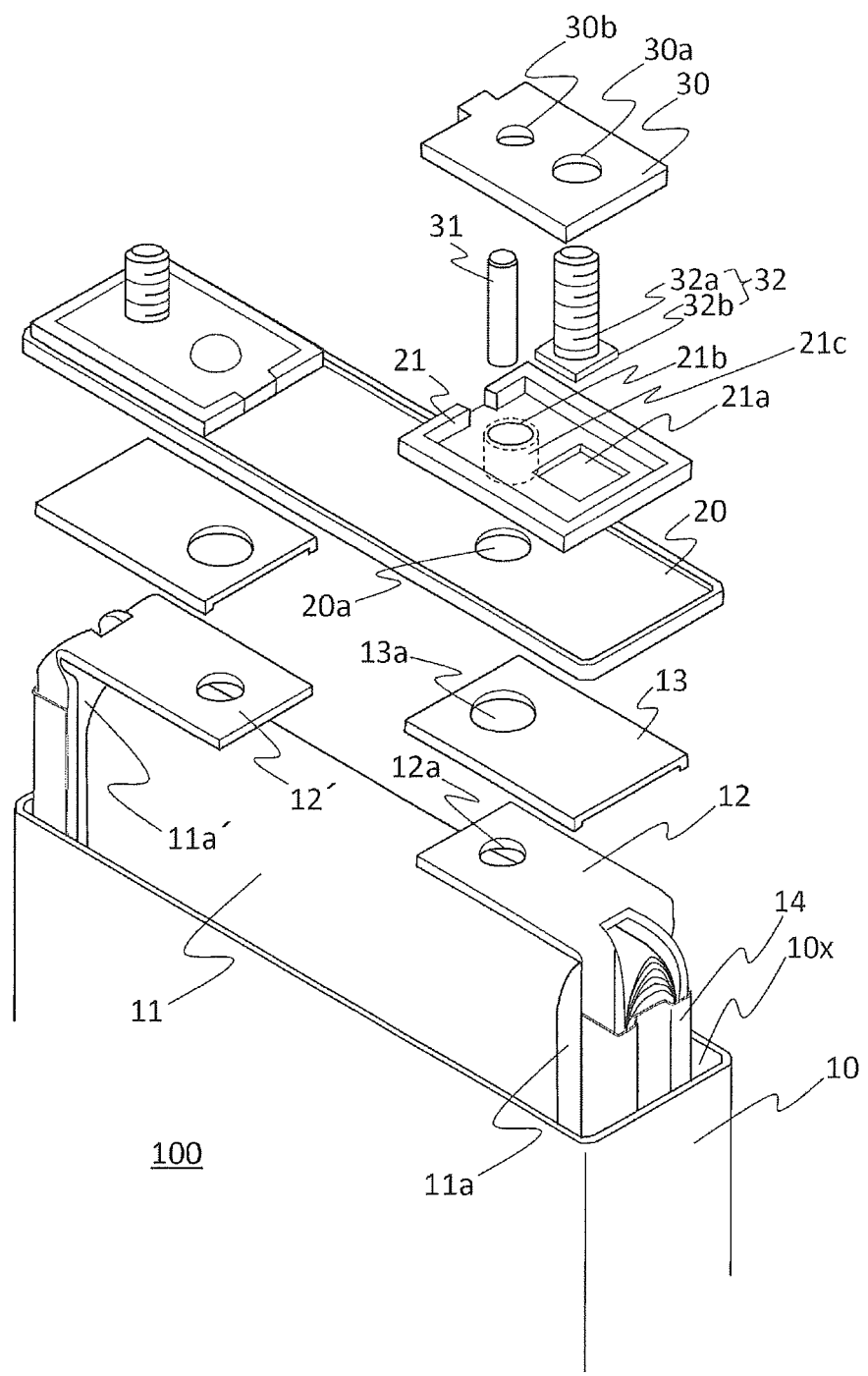
FIG. 13 is an exploded perspective view showing a structure of a prior-art nonaqueous electrolyte secondary battery.

As shown in FIG. 1, the nonaqueous electrolyte secondary battery 1 according to Embodiment 1 is similar to the prior-art nonaqueous electrolyte secondary battery 100 shown in FIG. 13 in a main structure including a container main body 10, a power generating element 11, and a lid portion 20 and is characterized in that connecting bodies 2 for directly connecting the power generating element 11 and connecting members 32 in structures of electrode portions 23 are provided.

In other words, each of the electrode portions 23 in the nonaqueous electrolyte secondary battery 1 includes, in place of the fixing member 31 and the terminal member 30 in the prior art, the connecting body 2 having a plate portion 2a, positioned on an insulating sealing member 21 and provided with a through hole 2c through which a bolt portion 32a of the connecting member 32 passes and a protruding portion 2b electrically and mechanically connected to a current collection connecting body 12 through a through hole 21b of the insulating sealing member 21, a through hole 20a of the lid portion 20, a through hole 13a of the insulating sealing member 13, and a through hole 12a of the current collection connecting body 12.

Figure 2:
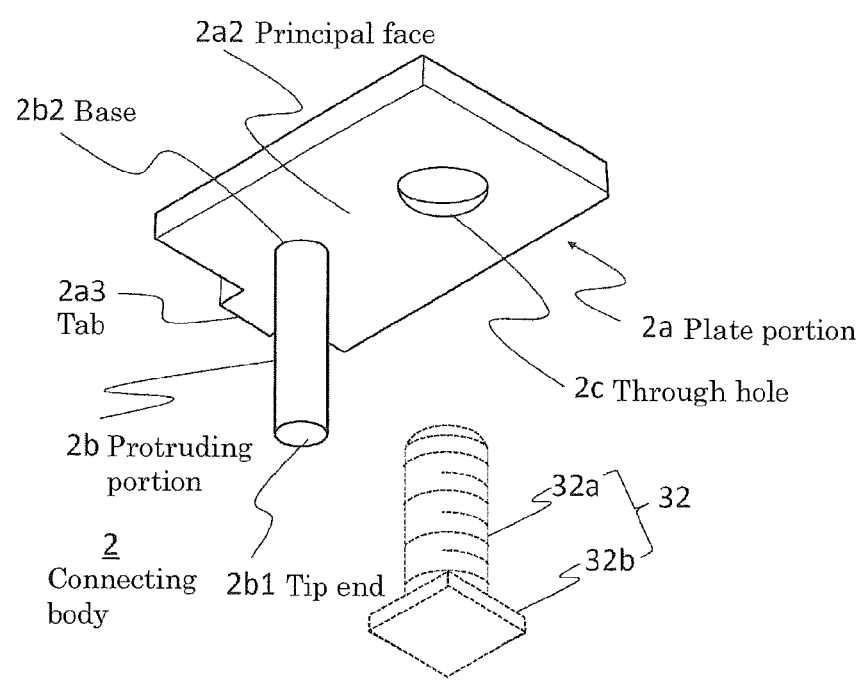
FIG. 2 is a perspective view showing a structure of a connecting body according to Embodiment 1 of the invention.

FIG. 2 shows a structure of the connecting body 2. In the connecting body 2, the plate portion 2a is a rectangular plate-shaped member which is the same as the terminal member 30 in the prior art and the protruding portion 2b is a rod-shaped member formed to extend directly downward in the drawing from a base 2b2 on a principal face of the plate portion 2a.

The plate portion 2a has a flat face (principal face) without a step, a recessed portion, a protruding portion, or a curved portion in an area from the base 2b2 of the plate portion 2a (described later) to respective sides of the rectangular shape forming outer edges excluding an area at a peripheral edge of the through hole 2c. The principal face 2a2 faces the lid portion 20 and is in contact with the insulating sealing member 21. Similarly, a principal face 2a1 exposed on the lid portion 20 shown in FIG. 1 also forms a flat face excluding an area at a peripheral edge of the through hole 2c. Moreover, a central portion of a short side close to the lid portion 20 in FIG. 1 protrudes as a tab 2a3 from the other portion. The tab 2a3 is used as a mark for recognition of an orientation of the plate portion 2a and a guide in provisionally fitting the plate portion 2a in the insulating sealing member 21 (described later).

The protruding portion 2b is positioned on the principal face 2a2 of the plate portion 2a, a peripheral edge of the base 2b2 forms a boundary with the principal face 2a2 of the plate portion, and the base 2b2 and the principal face 2a2 are formed continuously without a seam. In other words, the peripheral edge of the base 2b2 is surrounded with a side face of the protruding portion 2b and the principal face 2a2.

A length from the base 2b2 to a tip end 2b1 and a sectional shape correspond to dimensions of the prior-art fixing member 31 before riveting and excluding thickness of the terminal member 30, and the protruding portion 2b has a circular columnar shape in the drawing.

Although the tip end 2b1 of the protruding portion 2b is shown as a circular columnar end face in FIGS. 1 and 2, the tip end 2b1 is riveted and has a larger outer diameter than outer diameters of the through hole 12a and the other through holes in the assembled battery as will be described later. As material of the connecting body 2, aluminum, copper, or an alloy of them is used depending on polarity of the electrode portion 23.

As shown in FIG. 1, the insulating sealing member 21 on which the connecting body 2 is disposed includes a main body portion 21z having a placement face 21x which is a surface and on which the plate portion 2a is placed and a frame body 21y taller than the placement face 21x, the frame body 21y formed around the placement face 21x, and a cylindrical portion 21c communicating with the through hole 21b on the placement face 21x of the main body portion 21z and formed on a lower side in the drawing. At a portion of the frame body 21y, a notch 21y1 corresponding to a position and a shape of the tab 2b3 of the connecting body 2 is formed.

Although a position of the base 2b2 of the protruding portion 2b of the connecting body 2 is shown in a dotted line on the principal face 2a1 of the plate portion 2a in FIG. 1, this is imaginary illustration for explanation. A trace of the base 2b2 of the protruding portion 2b does not exist in the position on the actual principal face 2a1 and the principal face 2a1 is formed as the flat face.

In the above-described structure, the connecting body 2 corresponds to a connecting body in the invention, the plate portion 2a corresponds to a plate portion in the invention, and the protruding portion 2b corresponds to a protruding portion in the invention. The through hole 2c corresponds to a through hole in the invention. Furthermore, the power generating element 11 corresponds to a power generating element in the invention, a combination of the container main body 10 and the lid portion 20 corresponds to a device container in the invention, the connecting member 32 corresponds to an electrode terminal in the invention, and the nonaqueous electrolyte secondary battery 1 corresponds to an electric storage device in the invention.

The tip end 2b1 and the base 2b2 of the protruding portion 2b respectively correspond to a tip end and a base of the protruding portion in the invention, the insulating sealing member 21 corresponds to an insulating sealing member in the invention, the main body portion 21z and the cylindrical portion respectively correspond to a main body portion and a cylindrical portion in the invention, and the placement face 21x and the frame body 21y respectively correspond to a placement face and a frame body in the invention.

In this connecting body 2 in Embodiment 1, the plate portion 2a and the protruding portion 2b are formed integrally, the protruding portion 2b is in the circular columnar shape, and the plate portion 2a is larger than a sectional shape of the protruding portion 2b at the base 2b2 of the circular columnar protruding portion 2b, and the peripheral edge is surrounded with the principal face 2a2 to thereby have a face spreading from the peripheral edge of the base 2b2. As a result, the connecting body 2 functions as a rivet having the plate portion 2a as a head portion and the protruding portion 2b as a shaft portion.

In other words, the plate portion 2a and the protruding portion 2b are shapes in different positions obtained after plastic forming of a single kind of metal material and are not obtained by joining separate materials. Therefore, in the connecting body 2, a seam or a joint face is not formed between the principal face of the plate portion 2a and the base 2b2 of the protruding portion 2b protruding from the principal face.

Figure 3A:
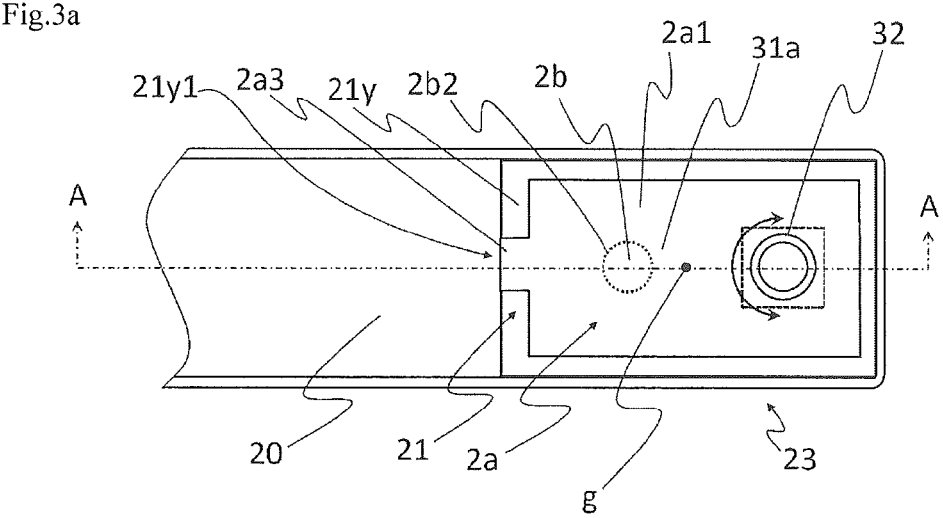
FIG. 3(a) is a plan view of a portion of the structure of the nonaqueous electrolyte secondary battery according to Embodiment 1 of the invention and FIG. 3(b) is a sectional view of the portion of the structure of the nonaqueous electrolyte secondary battery according to Embodiment 1 of the invention.
Figure 3B:
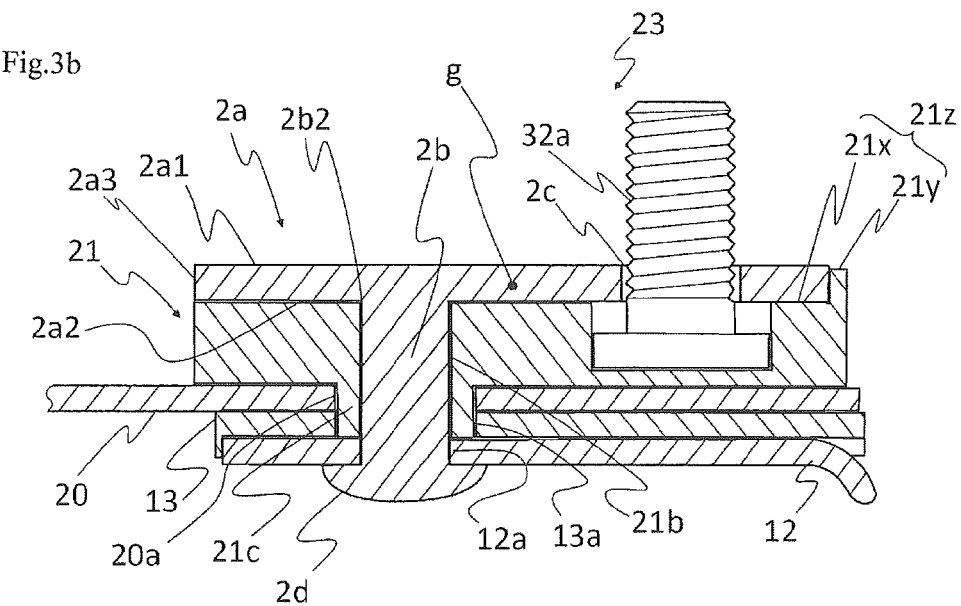

FIG. 3(a) shows a state of an area around the electrode portion 23 of the nonaqueous electrolyte secondary battery 1 formed by the connecting body 2 in a plan view of a portion and FIG. 3(b) is a sectional view of a portion along straight line A-A in FIG. 3(a).

As shown in FIG. 3(b), in the connecting body 2, the plate portion 2a is superimposed on a principal face of the insulating sealing member 21 and the protruding portion 2b protruding from the surface facing the principal face of the insulating sealing member 21 extends through the through hole 21b in the cylindrical portion 21c of the insulating sealing member 21 and passes through the through hole 20 of the lid portion 20, the through hole 13a of the insulating sealing member 13, and the through hole 12a of the current collection connecting body 12. In this state, an end portion exposed on a principal face of the current collection connecting body 12 is riveted and shaped into a rivet end 2d.

The connecting member 32 is fixed in the following manner. The bolt portion 32a of the connecting member 32 is inserted through the through hole 2c of the plate portion 2a and the protruding portion 2b is inserted through the through hole 21b so that an anti-rotation portion 32b is pinched between the plate portion 2a and the insulating sealing member 21.

As described above, because the rivet end 2d has a larger outer diameter than the respective through holes, the insulating sealing member 21, the lid portion 20, the insulating sealing member 13, and the current collection connecting body 12 are pressure-bonded to each other and fixed integrally by being pinched between the plate portion 2a of the connecting body 2 and the rivet end 2d of the protruding portion 2b, with the rivet end 2d formed. In other words, because the plate portion 2a functions as a head portion of the rivet and the protruding portion 2b functions as the shaft portion of the rivet, the respective portions from the insulating sealing member 21 to the current collection connecting body 12 are riveted.

The connecting body 2 and the current collection connecting body 12 are also connected electrically. Because a side face of the protruding portion 2b is covered with the cylindrical portion 21c of the insulating sealing member 21, the lid portion 20 and the connecting body 2 are insulated from each other.

A step of inserting the protruding portion 2b of the connecting body 2 through the respective through holes of the respective portions from the insulating sealing member 21 to the current collection connecting body 12 corresponds to a first step in the invention and a step of shaping the tip end of the protruding portion 2b into the rivet end 2d corresponds to a second step in the invention, these steps being for completing the structure shown in FIG. 3(b). Moreover, a step of fixing the connecting member 32 is also included in the first step in the invention.

If torque is generated about the bolt portion 32a of the connecting member 32 as shown with an arrow in FIG. 3(a) in attachment and detachment of an external load to and from the electrode portion 23 having the above structure, stress about the bolt portion 32a as a center of turning is applied to the plate portion 2a of the connecting body 2. However, as shown in FIG. 3(b) and described above, a mechanical property between the plate portion 2a and the protruding portion 2b is uniform and therefore looseness does not occur. Therefore, even if the external load is continually attached and detached to and from the electrode portion 23, increase in electrical resistance and sealing performance of the entire battery container can be maintained and, as a result, durability of the nonaqueous electrolyte secondary battery 1 can be enhanced.

Embodiment 1 exerts the following effects, because fastening of the insulating sealing member 21, the lid portion 20, the insulating sealing member 13, and the current collection connecting body 12 by riveting of the connecting body 2 is carried out by pressure contact of the plate portion 2a through the entire principal face 2a2 in contact with the insulating sealing member 21 as shown in FIG. 3(b).

Figure 14A:
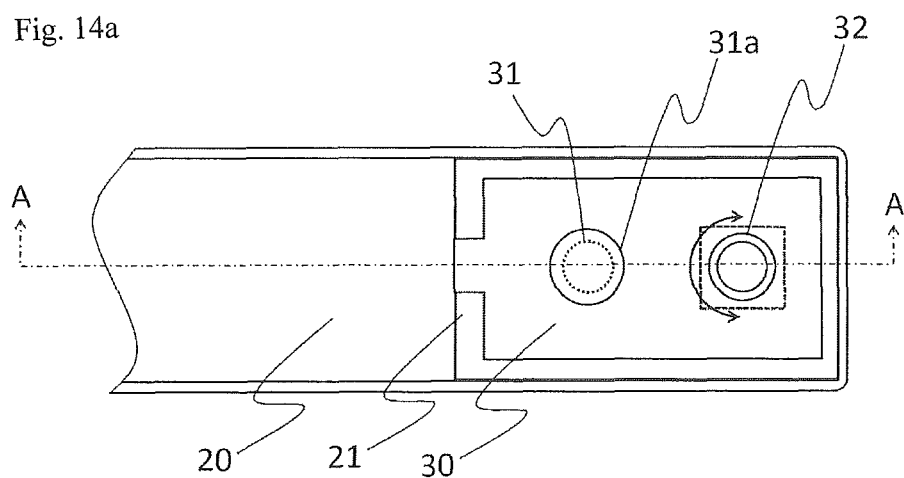
FIG. 14(a) is a plan view of a portion of the structure of the prior-art nonaqueous electrolyte secondary battery and FIG. 14(b) is a sectional view of the portion of the structure of the prior-art nonaqueous electrolyte secondary battery.
Figure 14B:
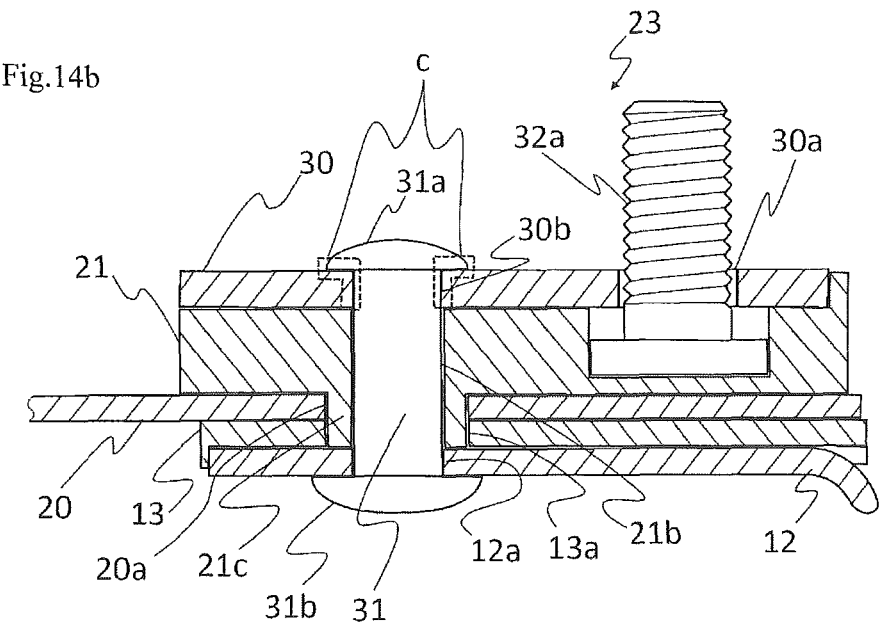

In the prior art shown in FIG. 14, because the pressure contact to the insulating sealing member 21 is carried out only through the rivet end 31a having a small area in contact with the surface of the terminal member 30, distribution of pressing of the insulating sealing member 21 by the plate portion 2a is non-uniform in the plane. Moreover, the rivet end 31a may be removed for the purpose of forming the plate portion into a flat face. In this case, the terminal member 30 and the fixing member 31 are kept joined to each other only by welding of a boundary between the through hole 30b of the terminal member 30 and the end portion of the fixing member 31, which causes looseness and also significant reduction in strength of the electrode portion 23.

On the other hand, in the pressure contact by the connecting body 2 in Embodiment 1, the placement face 21x of the insulating sealing member 21 is pressed by the principal face 2a2 and, as a result, the entire face of the insulating sealing member 21 is pressed against the surface of the lid portion 20.

Moreover, because the principal face 2a2 is the uniform flat face without a step, a recessed portion, a protruding portion, or a curved portion on its surface, pressure of the principal face 2a2 is transmitted as it is and substantially uniformly to the placement face 21x of the insulating sealing member 21. In addition, even after fixing of the insulating sealing member 21 and the connecting body 2, the principal face 2a2 and the placement face 21x are not deformed and maintained in surface contact and therefore sealing performance for preventing entry of foreign matter from between the frame body 21y and the principal face 2a1 and leakage of electrolyte solution or the like from the battery container is obtained. The protruding portion 2b is positioned in the through hole 21b and therefore does not influence pressure contact from the principal face 2a2.

Furthermore, a peripheral edge of the plate portion 2a of the connecting body 2 is surrounded with the frame body 21y of the main body portion 21z on the insulating sealing member 21. In this way, turning of the connecting body 2 about the protruding portion 2b as a rotation axis on the placement face 21x is suppressed after provisional assembly or completion of the electrode portion 23. Moreover, effect of suppressing torque applied to the protruding portion 2b in attachment and detachment of the external terminal to and from the connecting member 32 is also exerted.

As a result, the insulating sealing member 21 is securely fixed onto the lid portion 20 to enhance sealing performance of the battery container and to improve durability.

Furthermore, as shown in FIGS. 3(a) and 3(b), in the connecting body 2, a position of the base of the protruding portion 2b is shifted from a gravity center g of the plate portion 2a toward a center of the lid portion 20. The through hole 2c is shifted from the gravity center g of the plate portion 2a toward an outer edge of the lid portion 20. In this way, it is possible to secure sufficient position and area for arranging the connecting member 32 on the plate portion 2a and an entire face of the plate portion 2a substantially uniformly presses and seals a periphery of the bolt portion 32a of the connecting member 32 to thereby stably fix the connecting member 32.

In this manner, the connecting body 2a according to Embodiment 1 of the invention can improve durability of the nonaqueous electrolyte secondary battery 1. Because the plate portion 2a and the protruding portion 2b are formed integrally in advance, it is possible to simplify a manufacturing process of the nonaqueous electrolyte secondary battery 1.

Figure 4:
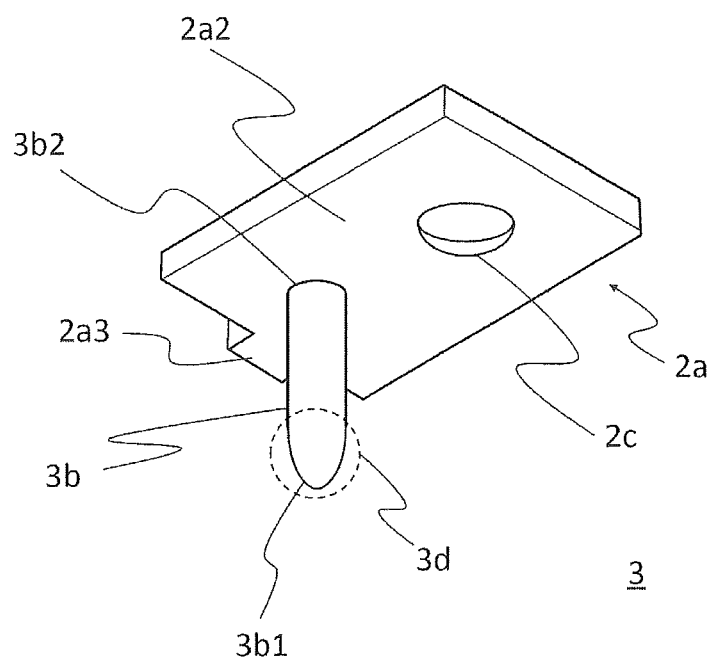
FIG. 4 is a perspective view showing another example of the structure of the connecting body according to Embodiment 1 of the invention.

Although the connecting body 2 has the circular columnar protruding portion 2b having a uniform sectional shape from the base 2b2, which is the boundary with the principal face 2a2 of the plate portion 2a, to the tip end 2b1, which is formed into the rivet end 2d, in the above description, the invention may have a connecting body 3 extending from a base 3b2 to an end portion 3d which is encircled with a dotted line in the drawing and which has a pointed tip end 3b1 as shown in FIG. 4. According to the connecting body 3, in assembly of the electrode portion 23, it is possible to swiftly insert a protruding portion 3b into the through hole by positioning the end portion 3d having the tip end 3b1 in an arbitrary position in the through hole 21. Therefore, it is possible to loosen strictness in positioning of the connecting body 2a and the lid portion 20 in mounting the connecting body 2a to the lid portion 20 to increase efficiency in the manufacturing process.

Figure 5A:
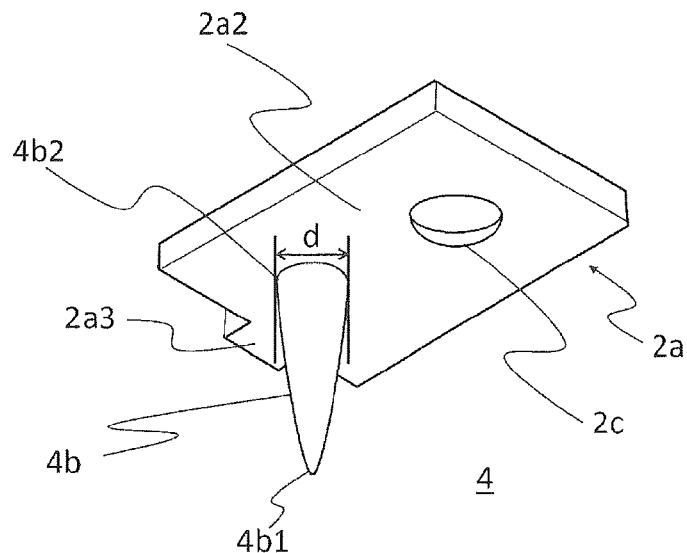
FIG. 5(a) is a perspective view showing another example of the structure of the connecting body according to Embodiment 1 of the invention and FIG. 5(b) is a sectional view of a portion of a structure of a nonaqueous electrolyte secondary battery using the other example of the structure of the connecting body according to Embodiment 1 of the invention.
Figure 5B:
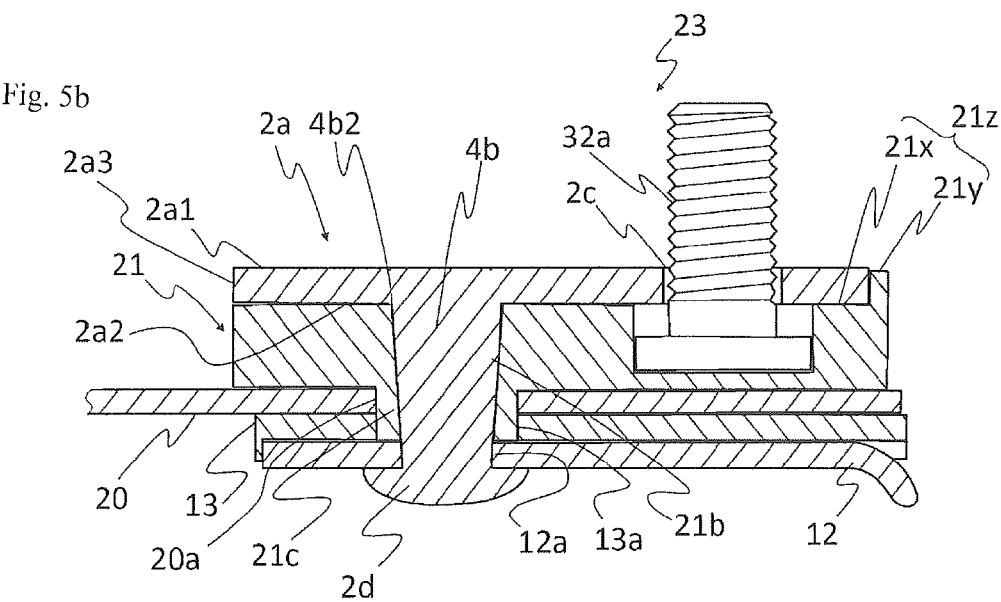

The invention may have a connecting body 4 including a conical protruding portion 4b with a sectional shape gradually reducing from a base 4b2 toward a tip end 4b1 as shown in FIG. 5(a). Especially, it is preferable that an outer diameter D of the base 4b2 of the protruding portion 4b is slightly larger than an outer diameter of the protruding portion 2b shown in FIG. 3. In this structure, as shown in FIG. 5(b), the protruding portion 4b inserted into the through hole 21b of the insulating sealing member 21 widens an inner diameter of the through hole 21b in an inserted direction and therefore an outer face of the widened cylindrical portion 21c is brought into pressure contact with edge portions of the through hole 20a of the lid portion 20 and the through hole 13a of the insulating sealing member 13. As a result, respective portions of the electrode portion 23, into which the connecting body 4 is mounted, are coupled more closely to secure higher sealing performance and further enhance durability of the nonaqueous electrolyte secondary battery.

Figure 6A:
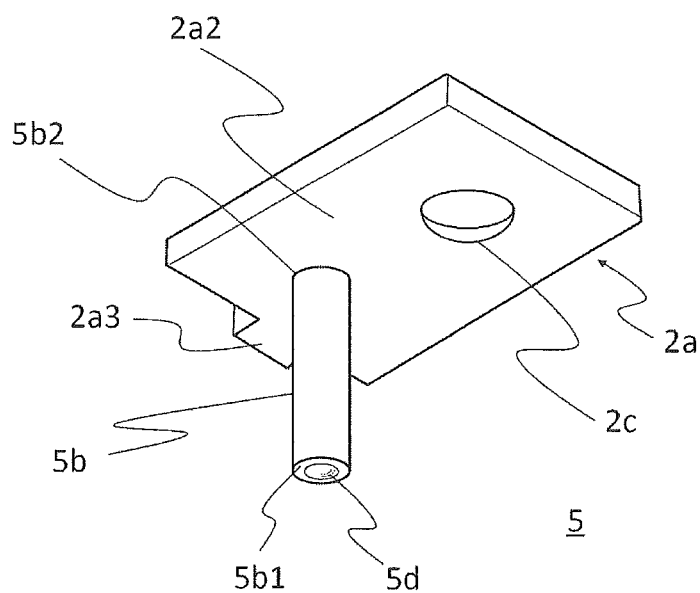
FIG. 6(a) is a perspective view showing another example of the structure of the connecting body according to Embodiment 1 of the invention and FIG. 6(b) is a sectional view showing the other example of the structure of the connecting body according to Embodiment 1 of the invention.
Figure 6B:
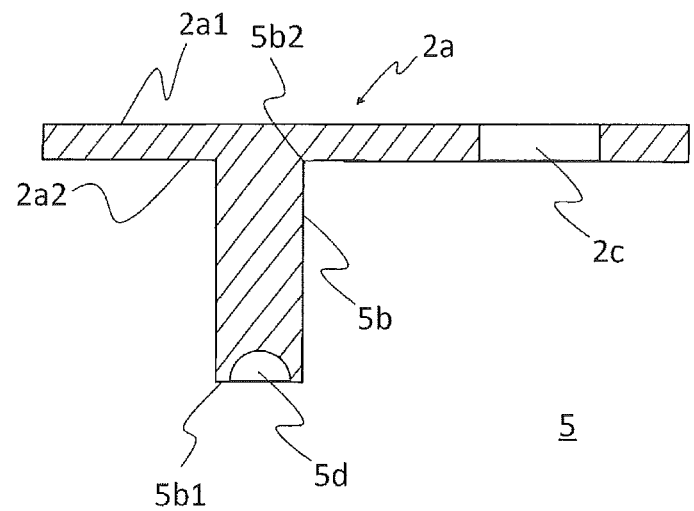

The invention may have a connecting body 5 including a protruding portion 5b in which a recessed portion 5d is formed in an end face of a tip end 5b1 protruding from a base 5b2 as shown in FIGS. 6(a) and 6(b). FIG. 6(b) is a sectional view taken along a straight line in FIG. 6(a) including a central axis of the protruding portion 5b and parallel to long sides of the plate portion 2a.

In the connecting body 5, the recessed portion 5d is formed into a hemispherical recessed portion so that strength of the protruding portion 5b is reduced to be suitable for riveting. Therefore, the electrode portion 23, into which the connecting body 4 is mounted, can secure higher sealing performance to further enhance durability of the nonaqueous electrolyte secondary battery. Moreover, because size and thickness of a rivet end after working can be further reduced, a volume of the power generating element 11 immediately below the rivet end can be increased to increase capacity of the nonaqueous electrolyte secondary battery. The shape of the recessed portion is not limited to the hemisphere but may be any shapes such as a circular cylindrical shape.

(Embodiment 2)

Embodiment 2 of the invention is a manufacturing method of the connecting body in the invention. Description will be presented with reference to FIGS. 7 and 8 and an embodiment of the connecting body in the invention will be described with this description.

Figure 7:
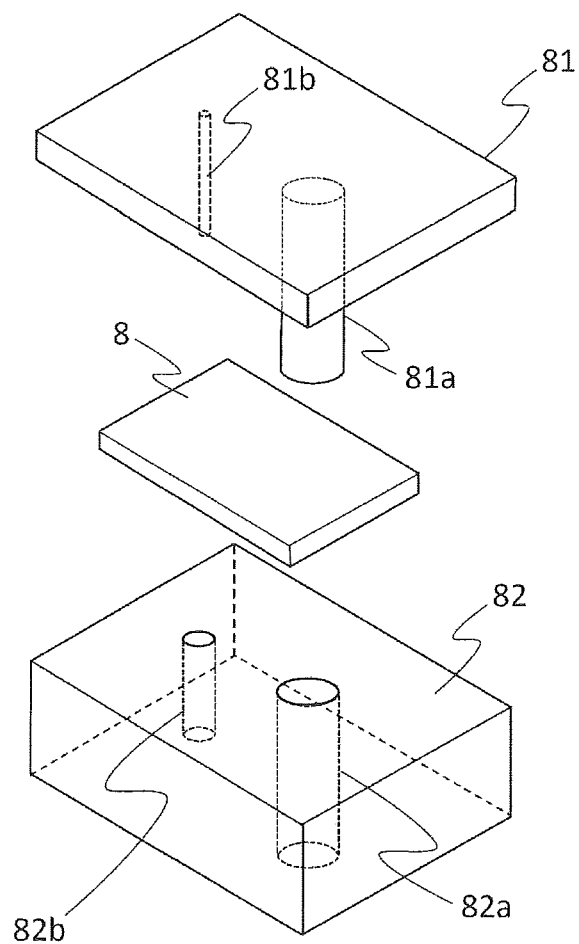
FIG. 7 is a drawing explaining a manufacturing method of a connecting body according to Embodiment 2 of the invention.

FIG. 7 is a perspective view of dies and a material base for carrying out the manufacturing method of the connecting body in the invention. As shown in FIG. 7, the manufacturing method of the connecting body in the invention presses a rectangular metal plate 8, which is the material base, between a male die 81 and a female die 82 to thereby obtain the connecting body.

The male die 81 includes punches 81a and 81b provided to a principal face facing the female die 82. The punch 81a has a shape conforming to the through hole of the connecting body and the punch 81b is provided in a position corresponding to the protruding portion. The male die 81 includes dies 82a and 82b formed on a principal face facing the female die 82 and respectively corresponding to the punches 81a and 81b.

Figure 8A:
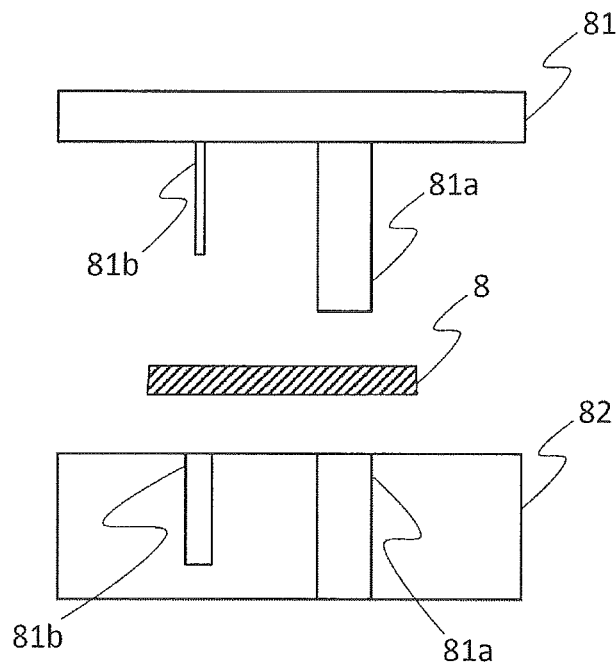
FIG. 8(a) is a drawing explaining the manufacturing method of the connecting body according to Embodiment 2 of the invention and FIG. 8(b) is a drawing explaining the manufacturing method of the connecting body according to Embodiment 2 of the invention.

Here, with reference to a side view in FIG. 8(a), positional relationships between and shapes of the punches and the dies will be described specifically. In the female die 82, the die 81a passes through the female die 82 and the die 82b is formed as a recessed portion which is an inverse shape of a sectional shape and an entire length of the protruding portion. In the male die 81, an entire length of the punch 81a is greater than thickness of the female die 82. On the other hand, the punch 81b has a smaller outer diameter than a diameter of the die 82 and a smaller entire length than depth of the die 82b.

Therefore, with a combination of the male die 81 and the female die 82, shearing is carried out by the punch 81a and the die 82a and drawing is carried out by the punch 81b and the die 82b.

Figure 8B:
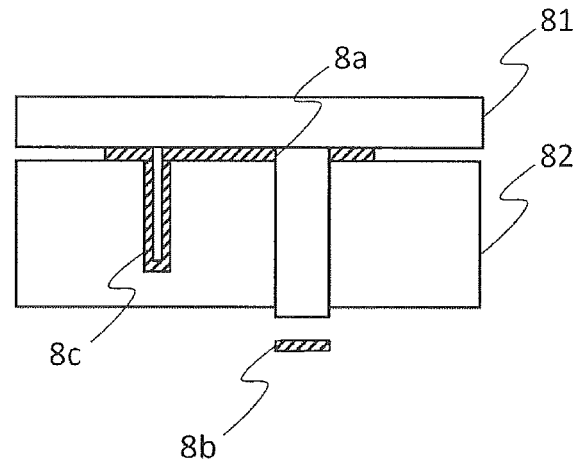

If the metal plate 8 is pressed by using the male die 81 and the female die 82 having the above structures, as shown in FIG. 8(b), the metal plate 8 is formed to have predetermined thickness, a sheared piece 8b is sheared by the punch 81a and the die 82a to form a through hole 8a, and a protruding portion 8c is formed by the punch 81b and the die 82b simultaneously.

Figure 9A:
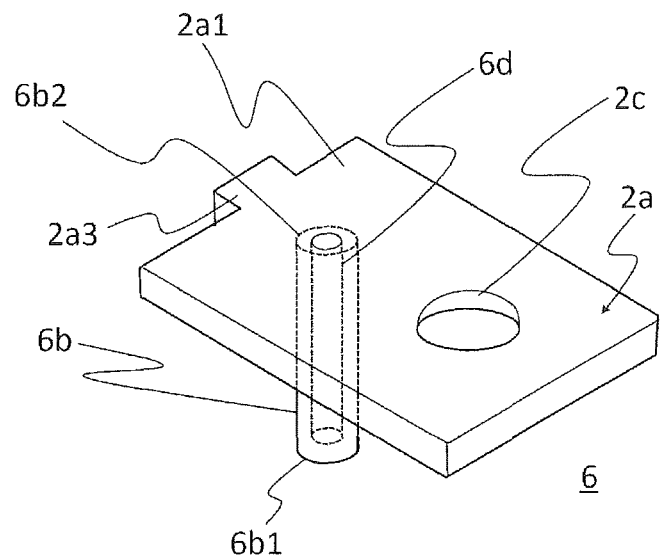
FIG. 9(a) is a perspective view showing another example of the structure of the connecting body according to the invention and FIG. 9(b) is a sectional view showing the other example of the structure of the connecting body according to the invention.
Figure 9B:
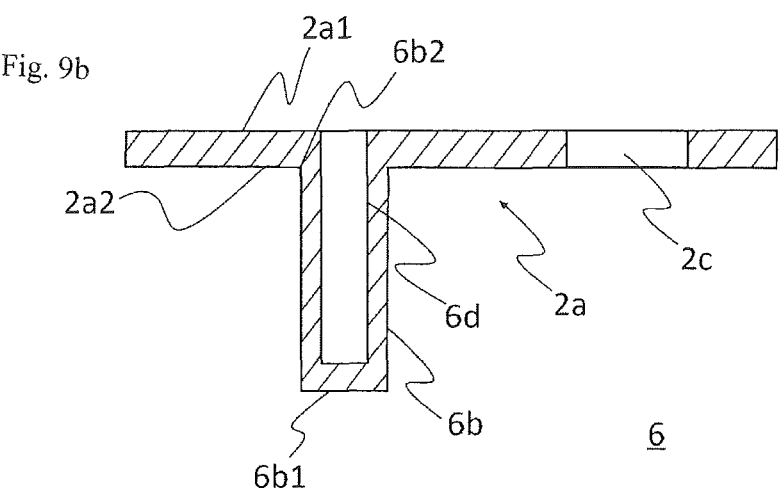

Another example of the structure of the connecting body in the invention formed in this manner is shown in a perspective view in FIG. 9(a) and a sectional view in FIG. 9(b). A connecting body 6 has a plate portion 2a and a through hole 2c similar to those of the connecting body 2 in Embodiment 1 and the protruding portion 8c which is an inverse shape of the punch 81b and the die 82b is formed as a protruding portion 6b having a base 6b2 positioned on the principal face 2a2 of the plate portion 2a and a protruding tip end 6b1 and, as a result, a cavity 6d is formed in the protruding portion 6b. The cavity 6d has one end which is open as an opening in the principal face of the plate portion 2a.

In the connecting body 6 having this structure, similarly to the connecting body 2, the plate portion 2a and the protruding portion 6b which are main portions are formed by forging of the metal plate 8 which is a single material base and an area between the plate portion 2a and the protruding portion 6b is in a uniform state in terms of a mechanical property. Therefore, similarly to the connecting body 2 in Embodiment 1, it is possible to improve durability of the nonaqueous electrolyte secondary battery 1 against continual attachment and detachment of an external load to and from an electrode portion 23. Moreover, by having the cavity 6d, high sealing performance of the electrode portion 23 can be secured and capacity of the nonaqueous electrolyte secondary battery can be increased in the same way as in Embodiment 1.

Although the step of forming the plate portion 2a and the step of forming the protruding portion 6b are carried out simultaneously in the above description, they may be carried out independently of each other in random order. This is especially suitable when the protruding portion 6b has a complicated shape. The forging step shown in FIGS. 8(a) and 8(b) corresponds to a drawing step and a forging step in the invention.

The cavity 6d may be formed as a through hole passing through an end portion of the protruding portion 6d. However, in assembly of the nonaqueous electrolyte secondary battery 1, the end portion of the end portion 6d is riveted to make sure the through hole is not open in order to prevent entry of foreign matter into the battery. Even if the cavity 6d is not formed as the through hole, it is preferable that an opening 6d1 is sealed and shaped to be flush with the principal face 2a1 of the plate portion 2a. By adjusting shapes of the punch 81b and the die 82b, it is possible to similarly form the connecting bodies 3 to 5 in the respective structure examples shown in FIGS. 4 and 5.

In this way, according to the connecting body and the manufacturing method of the connecting body in the invention, it is possible to improve the durability of the nonaqueous electrolyte secondary battery against a load on the connecting terminal applied by attachment and detachment of the external load.

However, the invention is not limited to the above-described respective embodiments. Although the electrode portion 23 is an element formed by the connecting body 2 and the connecting member 32 in the above description, the connecting member 32 may be directly provided on the principal face where the through hole 2c of the connecting body 2 is closed. Although the connecting body 2 and the connecting member 32 are connected by fitting the connecting member 32 into the through hole 2c, a slit or the like may be employed in place of the through hole. Although the plate portion 2a has a rectangular outer shape, it may be in an arbitrary planar shape such as a circle and a polygon according to a shape or the like of the lid portion 20.

Moreover, the electrode portion 23 may be an element formed by only the connecting body 2.

Figure 10A:
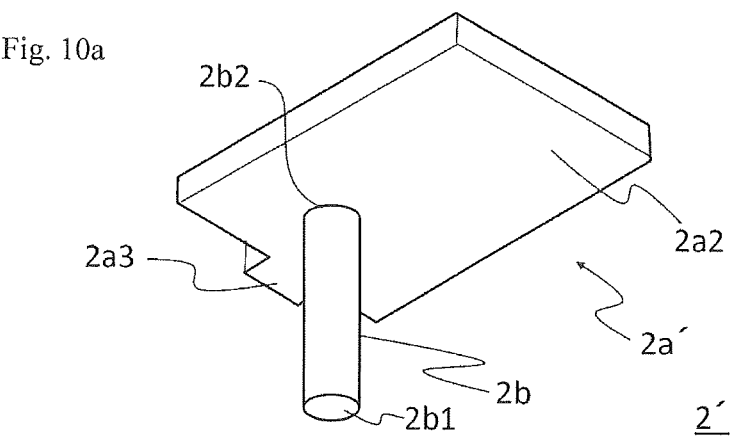
FIG. 10(a) is a perspective view showing another example of the structure of the connecting body according to the invention.
Figure 11:
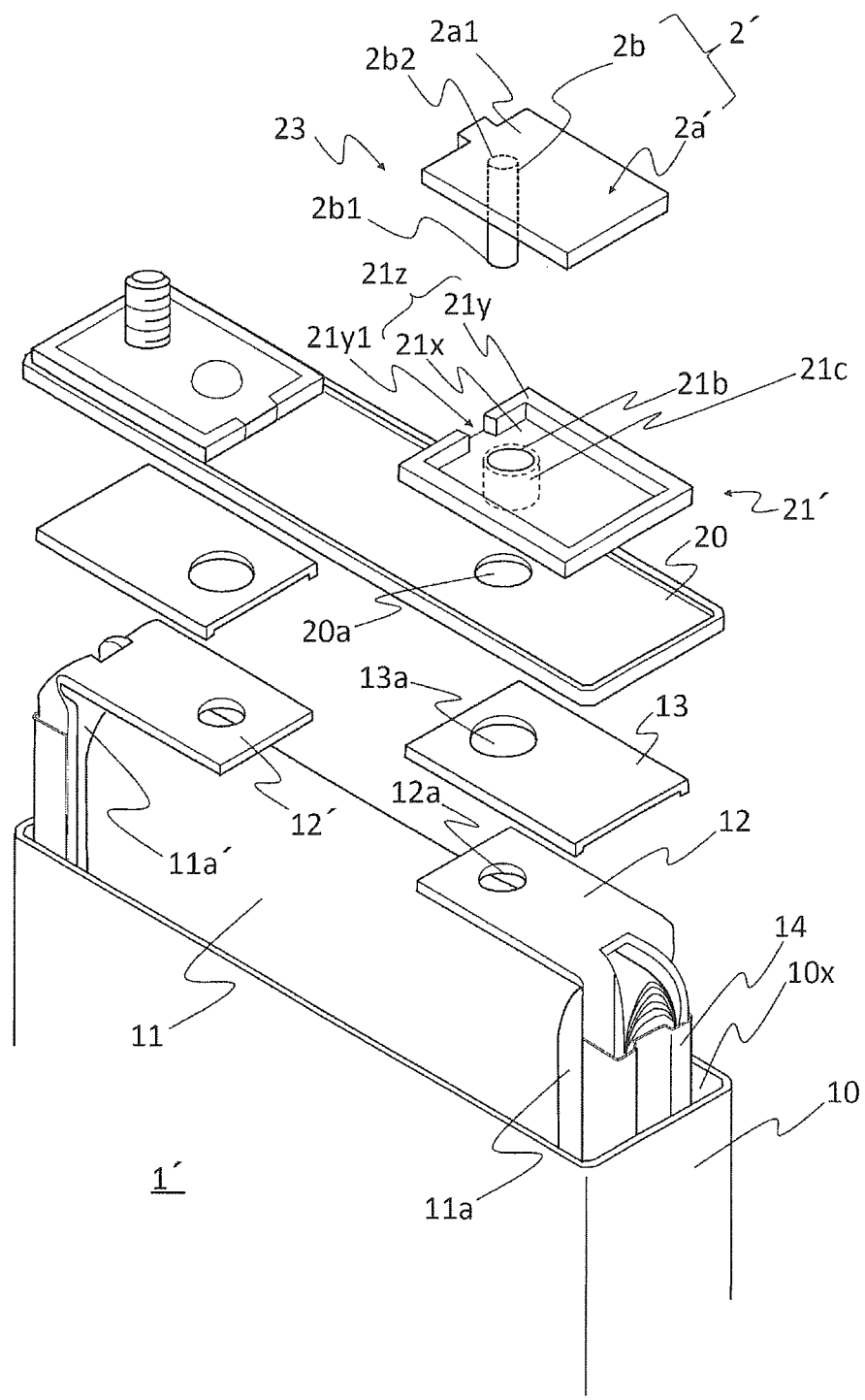
FIG. 11 is an exploded perspective view showing another example of a structure of an electric storage device in the invention.

In this case, the connecting body in the invention is realized as a structure in which a through hole is omitted in a plate portion 2a as in a connecting body 2' shown in FIG. 10(a). The plate portion 2a' is formed as a member in a shape of a flat plate having a principal face 2a2 and a principal face 2a1 shown in FIG. 11 and an insulating sealing member 21' facing the principal face 2a2 has a simpler structure in which a recessed portion 21a is omitted. FIG. 11 is an exploded perspective view of a nonaqueous electrolyte secondary battery 1' having the connecting body 2' as an electrode portion 23.

In this structure, a terminal, which can be connected to an external load, is directly welded and fixed to a position of the principal face 2a1 corresponding to the external load and an opening position of the through hole 2c to thereby complete electric connection between the nonaqueous electrolyte secondary battery 1' and the external load. Although torque about a protruding portion 2b is generated in welding because the protruding portion 2b and the fixed position of the terminal are away from each other, the protruding portion 2b and the plate portion 2a' are formed integrally and therefore this fixing operation does not cause looseness in the same way as in the description in Embodiment 1. Furthermore, because the plate portion 2a' and the insulating sealing member 21' completely come into surface contact with each other, it is possible to further secure mechanical strength of the electrode body 23.

In the structure shown in FIGS. 10(a) and 11, the electrode terminal in the invention corresponds to the terminal which can be connected to the external load.

Figure 10B:
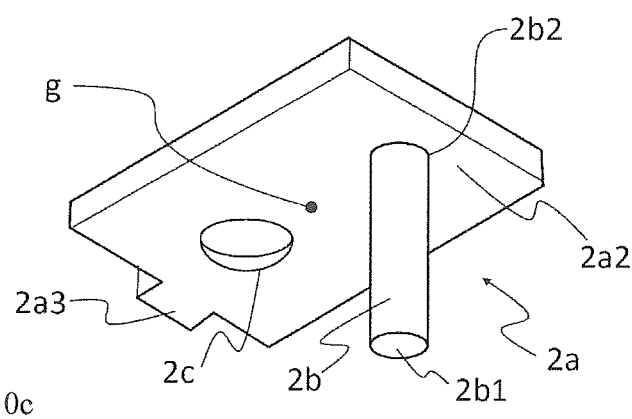
FIG. 10(b) is a perspective view showing another example of the structure of the connecting body according to the invention.
Figure 10C:
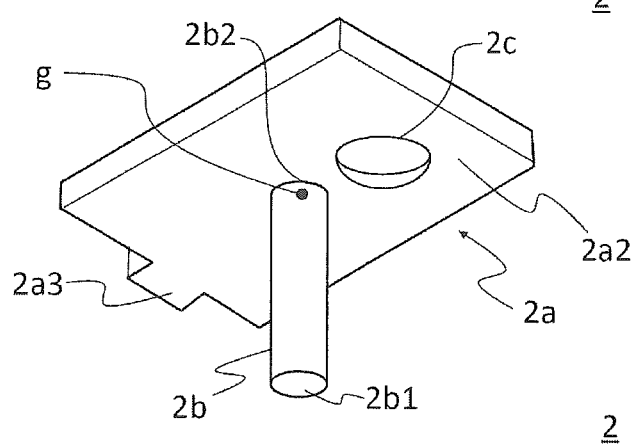
FIG. 10(c) is a perspective view showing another example of the structure of the connecting body according to the invention.

Although the base of the protruding portion 2b and the through hole 2c of the connecting body 2 are positioned on opposite sides of the gravity center g of the plate portion 2a and the protruding portion 2b is shifted toward the center of the lid portion 20 as shown in FIG. 3(a) and the like in the above description, a protruding portion 2b may be shifted toward an outer edge of the lid portion 20 as shown in FIG. 10(b). As shown in FIG. 10(c), a base of a protruding portion 2b may be in the same position as the gravity center g of the plate portion 2a. Especially, with the structure shown in FIG. 10(c), the plate portion 2b spreads in all directions around the protruding portion 2b and, as a result, it is possible to uniformly distribute pressure in pressing and vibrations and shocks applied to a battery container on the plate portion 2b to thereby further improve durability of the electrode portion 23.

Although the insulating sealing member 21 to be combined with the connecting body 2 has a structure in which the frame body 21y having, at a portion thereof, the notch 21y1 conforming to the tab 2a3 of the plate portion 2a as shown in FIG. 1, the planar shape of the plate portion 2b, i.e., the shapes of the principal faces 2a1 and 2a2 may be arbitrary shapes as described above and therefore shapes of the placement face 21x and the frame body 21y may be arbitrary shapes conforming to the shapes of the principal faces.

Figure 12A:
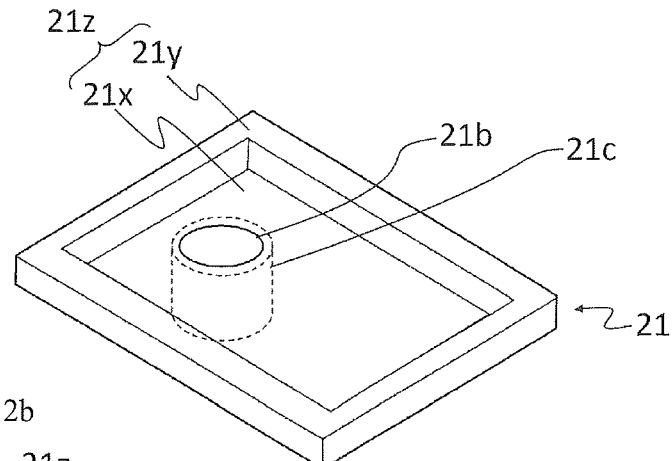
FIG. 12(a) is a perspective view showing another example of a structure of an insulating sealing member used for the electric storage device in the invention.

In an example of the structure of the insulating sealing member 21 shown in FIG. 12(a), a frame body 21y does not have a notch so as to be able to completely house the plate portion 2a, because shapes of principal faces 2a1 and 2a2 are rectangular shaped without a tab. In this structure, an entire joint line between the placement face 21x and the principal face 2a2 is covered with the frame body 21y, which further improves airtightness.

Figure 12B:
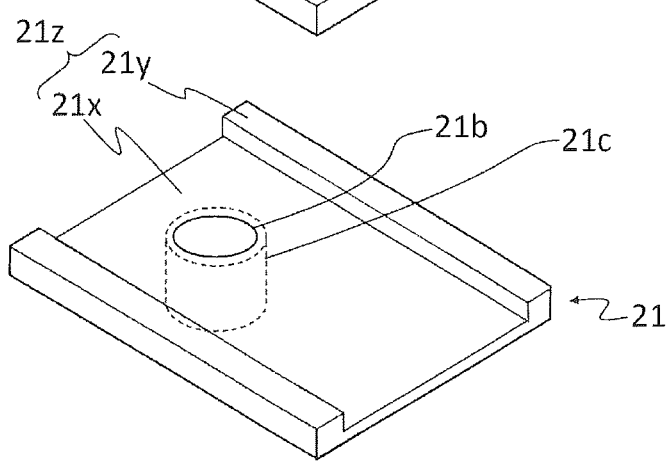
FIG. 12(b) is a perspective view showing another example of the structure of the insulating sealing member used for the electric storage device in the invention.
Figure 12C:
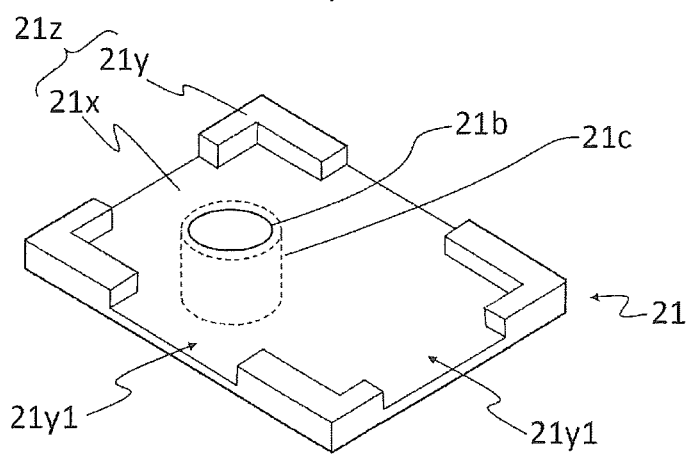
FIG. 12(c) is a perspective view showing another example of the structure of the insulating sealing member used for the electric storage device in the invention.

The frame body 21y may be realized as a form of paired fences corresponding to only a longitudinal direction of the plate portion 2a as shown in FIG. 12(b) or as a form of only portions corresponding to corner portions of the plate portion 2a as shown in FIG. 12(c). With these structures, it is possible to obtain effect of suppressing turning about the protruding portion 2b. Although the frame bodies 21y are provided only in the longitudinal direction in FIG. 12(b), they may be provided only in a short-side direction. However, the structure shown in FIG. 12(b) is more advantageous and the best preferable, because contact portions between the plate portion 2a and the frame bodies 21y are larger.

In short, the frame body in the invention is preferable, if it is taller than the placement face, can suppress turning of the plate portion 2b, or can cover the joint line between the placement face 21x and the principal face 2a2, and the frame body is not limited to specific forms.

As described above, the plate portion of the connecting body and the power generating element using the plate portion in the invention are not limited to specific method and structure, if the connecting member can be fixed to a specific position of the principal face and displaced from the position where the protruding portion is formed.

Although both of the end portion 3d, which is the tip end of the protruding portion 3b, and the protruding portion 4b have conical shapes with gradually reducing outer diameters in the structures of the connecting bodies 3 and 4 shown in FIGS. 4 and 5, the outer diameter of the protruding portion or the end portion of the protruding portion may discontinuously change, e.g., may reduce step by step while forming (a) step(s) or reduce per a certain length. The sectional shape may be any shape such as an oval, an elongated circle, and a rectangle besides the circle. In these cases except the case of the circle, the change in the outer diameter is a change in length of a periphery of the section.

Moreover, although the connecting body in the invention is formed by working the shape of the material base made of the single metal and the plate portion and the protruding portion are formed as portions in different shapes after the working in each of the above respective embodiments, the plate portion and the protruding portion may be integrally molded by using material bases made of the same kinds of or different metals into the connecting body. In this case, the plate portion and the protruding portion are integrated with each other by directly joining the principal face of the plate portion and the principal face of the protruding portion by welding (forge welding, pressure welding) or the like. Although the fixing member 31 and the terminal member 30 are joined by pressure bonding by riveting in the prior-art electrode portion 23 shown in FIG. 13(b), the plate portion and the protruding portion are coupled firmly and therefore it is possible to obtain certain durability higher than that in the prior art against continual attachment and detachment of the external load to and from the electrode portion 23.

Although the connecting body in the invention is manufactured by forging in each of the above respective embodiments, the plate portion and the protruding portion may be formed by casting or cutting. In short, the connecting body in the invention is not limited by a specific method of a manufacturing method.

Although the connecting body in the invention is used for the electrode portion of the nonaqueous electrolyte secondary battery in the above respective embodiments, other kinds of secondary batteries and primary batteries and an electric double layer capacitor apply to the electric storage device in the invention and the invention may be used for these electric storage devices. The electric storage device for which the connecting body in the invention is used corresponds to an electric storage device in the invention.

In short, the invention can be carried out by making various changes, including those described above, in each of the respective embodiments without departing from the gist of the invention.

INDUSTRIAL APPLICABILITY

The invention described above has effect of improving durability of the electric storage device such as the battery and is useful in the electrode portion of the secondary battery or in the secondary battery, for example.

DESCRIPTION OF REFERENCE SIGNS 1 nonaqueous electrolyte secondary battery
2, 3, 4, 5, 6 connecting body
2a plate portion
2a1, 2a2 principal face
2b, 3b, 4b, 6b protruding portion
2b1 tip end
2b2 base
2c through hole
2d rivet end
3d end portion
5d recessed portion
6d cavity
8 metal plate
23 electrode portion
32 connecting terminal
32a bolt portion
32b anti-rotation portion

The invention claimed is:

1. An electric storage device, comprising:
a power generating element;
a device container for housing the power generating element;
current collection connecting bodies respectively connected to a positive electrode and a negative electrode of the power generating element and
connecting bodies for electrically connecting electrode terminals and the current collection connecting bodies,
wherein protruding portions are connected to the current collection connecting bodies,
wherein plate portions are exposed on a surface of the device container,
wherein a connecting body of the connecting bodies electrically connects the power generating element and an electrode terminal of the electrode terminals positioned on the surface of the device container for housing the power generating element, the connecting body comprising:
a plate portion of the plate portions positioned on an outer surface of the device container; and
a protruding portion of the protrusion portions being in a position on a surface of the plate portion and displaced from a position of the electrode terminal, and including a tip end protruding to face the power generating element and a base with a peripheral edge surrounded with a principal face of the plate portion, and
wherein the protruding portion starts to protrude, toward the power generating element, from the principal face of the plate portion at the base to the tip end.

2. The electric storage device according to claim 1, wherein each of the protruding portions passes through a through hole of each of the current collection connecting bodies and the tip end of the protruding portion is riveted, and
wherein the riveted tip end of the protruding portion and the plate portion sandwich at least a wall body of the device container.

3. The electric storage device according to claim 2, further comprising:
insulating sealing members, each including a main body portion including a placement face in a shape conforming to the plate portion of the connecting body and a through hole open in the placement face and in a shape conforming to the protruding portion of the connecting body, and
a cylindrical portion communicating with the through hole of the main body portion,
wherein the main body portion is sandwiched between the riveted tip end of the protruding portion and the plate portion together with the wall body of the device container with the plate portion of the connecting body placed on the placement face, and
wherein the protruding portion of the connecting body is positioned in the cylindrical portion.

4. The electric storage device according to claim 3, wherein the placement face of the main body portion of each of the sealing members and the principal face of the plate portion of each of the connecting bodies are in surface contact with each other.

5. The electric storage device according to claim 3, wherein the main body portion of each of the insulating sealing members includes a frame body formed at a periphery of the placement face and taller than the placement face, and
wherein the plate portion of each of the connecting bodies is surrounded with the frame body.

6. The electric storage device according to claim 1, wherein a position of the protruding portion on a surface of each of the plate portions is closer to a gravity center of the device container than a position of each of the electrode terminals.

7. An electric storage device, comprising:
a power generating element;
a device container for housing the power generating element;
current collection connecting bodies respectively connected to a positive electrode and a negative electrode of the power generating element; and
connecting bodies for electrically connecting electrode terminals and the current collection connecting bodies,
wherein protruding portions are connected to the current collection connecting bodies,
wherein plate portions are exposed on a surface of the device container, and
wherein a connecting body of the connecting bodies electrically connects the power generating element and an electrode terminal of the electrode terminals positioned on the surface of the device container for housing the power generating element, the connecting body comprising:
 a plate portion of the plate portions positioned on an outer surface of the device container;
 a protruding portion of the protruding portions being in a position on a surface of the plate portion and displaced from a position of the electrode terminal, and including a tip end protruding to face the power generating element and a base with a peripheral edge surrounded with a principal face of the plate portion; and
 a connecting member inserted into a through hole of the plate portion,
wherein the connecting member protrudes from another surface of the plate portion away from the power generating element.

8. The electric storage device according to claim 7, further comprising:
a lid portion covering the surface of the container; and
an insulating sealing member including a main body portion, including:
 a placement face in a shape conforming to the plate portion of the connecting body;
 a first through hole open in the placement face and in a shape conforming to the protruding portion of the connecting body; and
 a second through hole open in the placement face for passing the connecting member,
wherein the protruding portion passes through the lid portion, and an entirety of the connecting member is disposed above the lid portion.

9. The electric storage device according to claim 7, wherein the connecting member protrudes from the principal surface and said another surface of the plate portion, the protruding portion protruding only from the principal surface of the plate portion.

* * * * *